May 17, 1927. 1,628,870

T. C. ALFRED

ROTARY CUTTING HEAD

Filed Feb. 2, 1925

Inventor

T. C. Alfred

By W. S. McDowell

Attorney

Patented May 17, 1927.

1,628,870

UNITED STATES PATENT OFFICE.

THEODORE C. ALFRED, OF LANCASTER, OHIO.

ROTARY CUTTING HEAD.

Application filed February 2, 1925. Serial No. 6,213.

This invention relates to an improved blade support for rotary cutting heads, and has for its primary object the provision of an improved and simplified device by means of which relative adjustment can be effected between the rotary cutting blades of a cutter head and the stationary blade so that a proper cutting relation may exist at all times between the rotary and stationary blades and a compensating means provided to counteract the effects of wear and the sharpening of the blades.

In accordance with the invention there is provided a cutter head which is formed to include a frame mounted for rotation about a longitudinal axis, the said frame carrying arms to the outer portions of which are adjustably connected a plurality of blade holders which are adjustable transversely with respect to the longitudinal axis of the frame in order that the knives or cutting blades supported thereby may be moved in and out to control the effective cutting diameter of the head and in order to advance the blades or retract the blades with respect to the head so as to govern the relation between the cutting edges of said blades and the corresponding meeting edges of a stationary blade.

A further object of the invention resides in socketing the arms of the cutter head for the reception of tongues provided in connection with the adjustable blade holders and in providing the arms with elongated slots through which frictional binding devices pass from the holders, whereby through the adjustment of said devices said holders and the blades supported thereby may be moved longitudinally in the sockets provided in said arms, the knives on said holders engaging with the side walls of the sockets so as to prevent rotary or turning movement of the holders with respect to said arms.

A further object of the invention rests in the provision of a cutter head wherein is provided an improved construction for permitting of the adjustment wherein the blades will retain their fixed positions of adjustment throughout the active operation of the cutter head.

With these and other objects in view, as will appear as the description proceeds, the invention consists in the novel features of construction, combinations of elements and arrangements of parts hereinafter to be fully described and pointed out in the appended claims.

Figure 1:
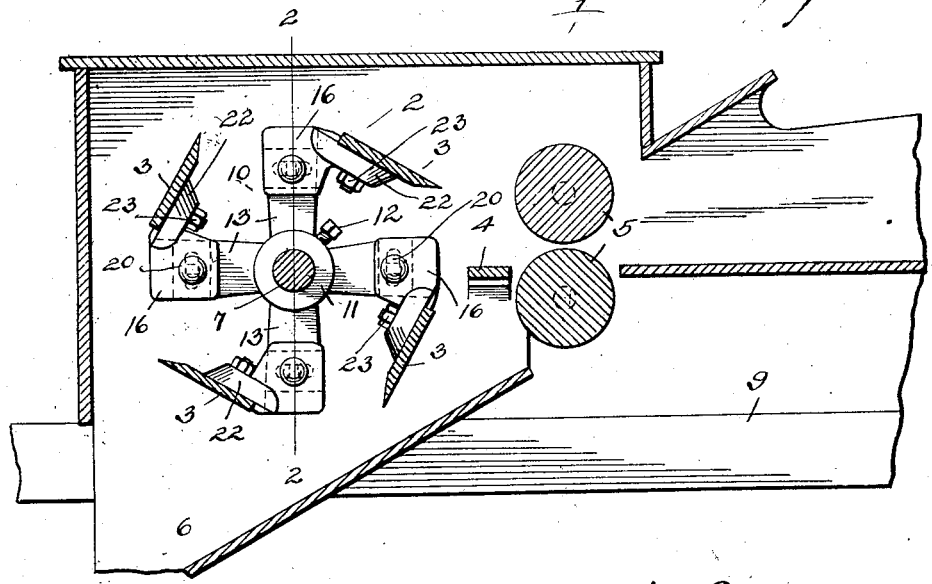
Figure 2:
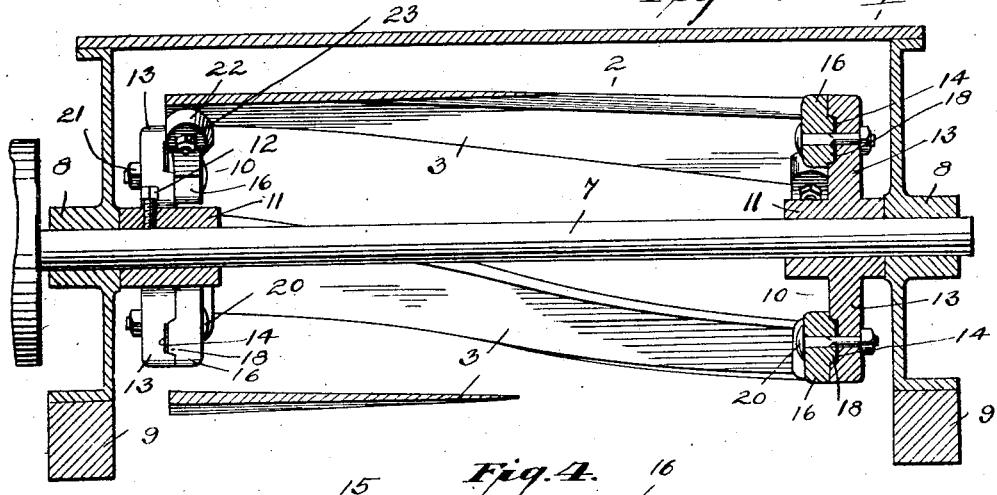
Figures 3, 4:
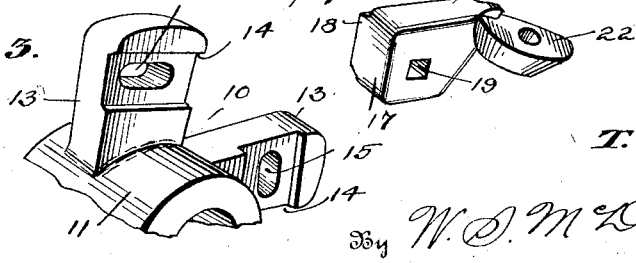

In the accompanying drawing:

Figure 1 is a vertical longitudinal sectional view taken through a cutting or reducing machine equipped with the adjustable rotary cutter head comprising the present invention, Figure 2 is a vertical longitudinal sectional view taken through the cutter head on the plane indicated by the line 2—2 of Figure 1, Figure 3 is a detail perspective view of one of the end frames comprising the cutter head, and Figure 4 is similar view of one of the adjustable blade holders.

Referring more particularly to the drawings the numeral 1 designates generally a cutting, chopping or reducing machine and, for present purposes, may be of the type specifically adapted for use in connection with the cutting, comminuting and reducing of farm products for use in the feeding live stock, poultry, etc. Machines of this type are constructed to employ a rotary cutting head 2, including a plurality of spiral revolving cutting blades 3, which register in cutting relation with a stationary blade 4. The stock to be cut is fed into engagement with the cutting blades by rolls 5 so as to pass between the cutting edges of the relatively movable blades and cut or chopped by these blades into proper lengths or sizes. The reduced stock is then permitted to drop by gravity into the discharge compartment 6 of the machine.

In constructions of this character considerable difficulty has been encountered heretofore in providing proper cutting relation between the knife edges of the blades 3 and 4. The most generally used construction is that of rigidly uniting in non-adjustable relation the cutting blades 3 upon the cutter head 2 so that the said head may be placed, during manufacture, in a revolving grinding machine and the cutting edges thereof accurately ground so that all of the cutting edges lie in a true circle. Then, by securing proper adjustment between said cutting edges and the corresponding edge of the stationary blade 4 an efficient cutting action is to be had. However, due to the effects of wear, the metallurgical differences existing in the materials from which the blades 3 and 4 are formed, the cutting edges of the blades 3, after comparatively short periods of use become worn, irregular, do not lie in a true circle, the center of which being the longitudinal axis of the head 2, and as a result there exists an improper registration between said blades by means of which rapid and efficient cutting can not be performed. To obviate this it has been proposed to provide means whereby the blades 3 are adjustable individually with respect to the stationary blade 4. However, in all of the adjustable devices of which I am aware the holders for the blades very quickly lose their required positions of adjustment so that a condition is present which from a cutting standpoint is even less efficient than the fixed cutting head. The present invention, therefore, provides a cutter head which while enabling removable knives to be independently adjusted yet provides the rigidity and strength of the solid or non-adjustable form of cutting head.

To this end the rotary cutting head 2 is formed to include a longitudinally extending shaft 7 having its ends journaled in connection with bearings 8 formed in connection with the frame 9 of the machine. Between the bearings 8 the shaft 7 is provided with a pair of end frames 10. Each frame 10 is formed to include a hub 11 which is rotatably connected with the shaft 7 by means of a set screw 12. Radiating from the hub 11 is a plurality of arms 13, which have their outer ends provided with sockets 14 and with elongated slots 15.

Mounted for transverse adjustment upon the arms 13 is a plurality of blade holders 16. These holders are formed with body portions 17 which include on one face thereof a longitudinally extending rib 18, which is arranged to be seated within a socket 14 so that the side walls of the rib and said socket will be in registry or meeting relation as shown more particularly in Figure 2. Also, the body portion 17 is provided with a square opening 19 which is adapted to receive the squared portion of the shank of a head fastening bolt 20, the threaded end of the shank of said bolt passing through the slot 15 of one of the arms 13 and having its outer end provided with a nut 21, which is capable of being tightened so as to draw the rib 18 within the socket 14 to maintain the holder in non-rotatable engagement with the arm 13 with which it is connected. It will be understood that as the cutting head revolves the strains and stresses which the blades thereof encounter re-act through the holders 16, and the tendency is to turn or twist such holders around their fastening connection with the arms 13 of the frame. This tendency is, however, counteracted by the provision of the ribs 18, which seat within the sockets 14 and effectively prevent such rotary movement on the part of the holders, with the result that the blades 3 are securely maintained in their fixed positions of adjustment. The body portion of each holder is provided with an angularly directed tongue 22 which is drilled for the reception of fastening devices 23 employed for connecting the ends of the blades 3 to the holders. The tongues 22 are disposed on an angle with respect to the body portion 17 of the holders, so that the blades 3 will be properly supported and the cutting edges thereof directed for rotary engagement with the stationary blade 4.

It will be seen that as the cutting edges of the blades 3 and 4 wear, compensation for this condition can be made by the mere loosening of the bolts 20 so as to relieve the binding friction between the holder 16 and the arms 13. This allows the holders and the blade carried thereby to be adjusted longitudinally with respect to the sockets 14, so as to advance or retract the cutting edges of the blades with respect to the true cutting circle of the head. When the desired adjustment is secured the nuts 21 are tightened, thereby securely seating the holders in non-rotatable engagement with said arms and the cutter head is again in condition for proper operation. It will be seen that the device, while simple in all essential respects, is an efficient and effective organization of parts wherein is combined in a cutter head both rigidity and adjustability on the part of the cutting blades, and a structure wherein the mechanical objections and failures of prior devices are eliminated.

In order to facilitate the insertion of the ribs 18 into the sockets 14, the cooperative side walls of the ribs and sockets are preferably inclined or tapered. Since these parts are usually formed from castings or forgings, the tapering of the side walls insures proper registration between parts, without involving expensive machine operations.

What is claimed is:

1. A rotary cutting head comprising a frame adapted for rotation about a longitudinal axis, the outer portion of said frame being provided with a recess arranged transversely with respect to said axis, a blade holder including a rib arranged to be seated within said recess, binding devices for seating and maintaining the rib of said holder within said recess at various positions of longitudinal adjustment with respect thereto, and a cutting blade connected with said holder so that the cutting edge of said blade may be advanced or retracted tangentially with regard to the cutting circle of said blade in accordance with the longitudinal adjustment of the holder with respect to said frame.

2. A rotary cutting head comprising a frame mounted for rotation about a longitudinal axis, a cutting blade holder carried by the outer portion of said frame, and adjustable tangentially with respect to the circular path of travel of said frame, a rib and groove connection between said holder and said frame to prevent twisting movement of said holder with respect to the frame, and a frictional binding device between said holder and frame permitting of longitudinal adjustment of the holder with respect to said frame.

3. A rotary cutting head comprising a plurality of radiating arms, blade holders adjustably carried by the outer ends of said arms, interfitting tongue and groove connections between said holders and said arms permitting of longitudinal adjustment of said holders with respect to said arms, and tangentially adjustable with respect to the circular orbit of travel of said arms, binding devices passing through said holders and arms for retaining the holders in fixed positions of longitudinal adjustment with respect to said arms, and cutting blades carried by the outer portions of said holders and adjustable in unison therewith.

4. A cutter head comprising a plurality of radiating arms having slots and grooves provided in the outer portions thereof, cutting blade holders provided with ribs arranged to be received within the grooves of said arms, fastening devices provided in connection with said holders and passing through the slots in said arms for permitting of longitudinal and tangential adjustment of said holders with respect to said arms, and cutting blades carried by the outer portions of said holders.

5. A cutter head comprising a plurality of radiating arms having slots and grooves provided in the outer portions thereof, cutting blade holders provided with ribs having tapered side walls arranged to be received within the grooves of said arms, fastening devices provided in connection with said holders and passing through the slots in said arms for permitting of longitudinal and tangential adjustment of said holders with respect to said arms, and cutting blades carried by the outer portions of said holders.

6. A rotary cutting head comprising a frame including radiating arms adapted for rotation about a longitudinal axis, a plurality of cutting blades, holders for said cutting blades, and an adjustable connection between said holders and said arms admitting of adjustment on the part of said blades in directions tangentially to the the circle of rotation of said arms.

In testimony whereof I affix my signature.

THEODORE C. ALFRED.